Patented July 4, 1950

2,514,236

UNITED STATES PATENT OFFICE 2,514,236

MANUFACTURE OF PIGMENTS

Joseph Glassman, Blackley, Manchester, England, assignor to Imperial Chemical Industries Limited, a corporation of Great Britain No Drawing. Application February 21, 1949, Serial No. 77,677. In Great Britain March 12, 1948

2 Claims. (Cl. 106—289)

This invention relates to the manufacture of pigments and more particularly it relates to the manufacture of pigments in a highly dispersed form suitable for colouring rubber and synthetic polymeric materials and for the pigmentation of masses to be spun into artificial filaments, and especially for the pigmentation of viscose before spinning.

A method of producing brown shades by means of mass pigmentation of viscose is to mix with the viscose solution before spinning, two or more pigments in suitable proportions to give the desired shade of brown. Thus for example brown shades can be obtained by using mixtures of carbon black, Monolite Fast Yellow GN (Schultz-Farbstoff Tabellen No. 84) and Monolite Fast Scarlet RN (Schultz-Farbstoff Tabellen No. 86; Colour Index No. 69). This method however suffers from the disadvantage that the shade of the filaments obtained shows wide variation; there has been a separation of the black from the yellow or scarlet as a result of differences in behaviour in or near the spinnerets.

In the specification of my British Patent No. 604,875 I have described a process whereby highly dispersed pigments suitable for the mass pigmentation of viscose can be obtained by generating an azo pigment in the presence of carbon black. The azo pigments referred to in that specification are all monoazo compounds and with these monoazo compounds it has not been found possible to obtain pigments of desirable rich chocolate brown shades. I have now found that such shades can be obtained by using instead of a monoazo pigment, a red disazo pigment derived from benzidine or substituted benzidine and an arylmethylpyrazolone.

According to my invention therefore I provide a process for the manufacture of a cholocate brown pigment which comprises coupling one molecular proportion of tetrazotised benzidine or substituted benzidine with two molecular proportions of an aryl methyl pyrazolone in the presence of carbon black dispersed in one or other of the aqueous solutions of which the mixing brings about the coupling.

As examples of substituted benzidines which may be used there may be mentioned for example dianisidine, dichlorobenzidine and tolidine and as arylmethylpyrazolones there may be mentioned for example, phenylmethylpyrazolone and tolylmethylpyrazolone. Mixtures of the diamines or of the coupling components may be used to produce in each case the correct shade of red pigment to give with the carbon the desired shade of brown. The mixtures of diamines used with 1-p-tolyl-3-methyl-5-pyrazolone in the specifications of my British applications Nos. 36,544/46 and 32,544/47 are especially suitable for use in the invention.

The carbon black should be highly dispersed before use. The dispersion may be carried out for example by gravel milling in the presence of water, caustic soda and disodium dinaphthylmethane-di-$\beta$-sulphonate until the bulk of the mass of material is in the form of particles not greater than 6 microns in diameter, and the material contains no particles greater than 10 microns in diameter.

The products of the invention are conveniently preserved in the form of aqueous pastes for use in pigmenting viscose but may be dried if desired for other purposes.

The products of the invention are, as will be understood, chocolate brown pigments, the shade of the black being tempered, so to speak with red. By limiting in certain cases the proportions of carbon black, strong bright tan-brown shades may also be obtained. They can be used for colouring rubber and synthetic resins for example polyvinyl chloride. They can be used with or without further dispersion for the pigmentation of viscose or of cellulose acetate before spinning and they do not show the undesirable property of giving filaments of varying shades due to the separation of the carbon black from the azo pigment during the spinning process. The pigments show good chemical stability and good fastness to light.

The invention is illustrated but not limited by the following examples in which the parts are by weight.

Example 1

192 parts of carbon black are dispersed by milling with water, caustic soda and disodium dinaphthylmethane-di-$\beta$-sulphonate and the suspension so obtained is added to the filtered tetrazonium sulphate solution made from 342 parts of o-dianisidine sulphate and 515 parts of sulphuric acid in water.

The suspension is stirred and an aqueous solution of 200 parts of the water-soluble condensation product of cetyl alcohol with 17 molecular proportions of ethylene oxide is added. The suspension is cooled to 5° C. and stirred, and a solution of 432 parts of 1-p-tolyl-3-methyl-5-pyrazolone, 100 parts of caustic soda, and 1240 parts sodium acetate crystals, in 10,000 parts of water is gradually added.

The brown pigment so obtained is stirred for 1 hour to complete the coupling reaction. The suspension is filtered and the resulting paste is washed with cold water. The paste is mixed with 200 parts of disodium dinaphthylmethane-di-β-sulphonate and 200 parts of water. The pigment slurry on obtained is stirred and heated to 95° C. The product is then cooled and a stable paste is obtained which shows no separation of the constituent pigments when stored for several months. The product is satisfactory without further milling treatment for use in the pigmentation of viscose before spinning. It gives deep rich brown shades of high tinctorial strength and excellent fastness properties to light and to the chemicals normally employed in treating the viscose filaments.

*Example 2*

A tetrazonium sulphate solution is prepared from a mixture of 245.7 parts of 3:3'-dichlorobenzidine sulphate and 73.2 parts of o-dianisidine in 4800 parts of water containing 412 parts of sulphuric acid. To the filtered solution there are added 200 parts of carbon black in the form of an aqueous suspension prepared as described in Example 1. The suspension is stirred and 800 parts of sodium acetate crystals, and 20 parts of the water-soluble condensation product of cetyl alcohol with 17 molecular proportions of ethylene oxide are added. A solution of 376 parts of 1-p-tolyl-3-methyl-5-pyrazolone and 82 parts of caustic soda in 11,000 parts of water is then added.

The pigment suspension so obtained is stirred for 1 hour and then heated to 70° C. The suspension is filtered and the resulting paste is washed with cold water.

The brown pigment paste is ball milled with a concentrated aqueous solution of 190 parts of disodium dinaphthylmethane-di-β-sulphonate and a paste stable to storage is obtained.

The product may be incorporated into viscose solution before spinning. It gives deep rich brown shades, slightly yellower than those obtained using the pigment of Example 1. The pigmented yarn thus produced shows excellent fastness properties.

*Example 3*

A tetrazonium sulphate solution is prepared from a mixture of 122 parts of o-dianisidine and 92 parts of benzidine in 4800 parts water containing 400 parts sulphuric acid. To the filtered solution there are added 160 parts of carbon black in the form of an aqueous suspension prepared as described in Example 1. The suspension is stirred and coupled with 1-p-tolyl-3-methyl-5-pyrazolone under the conditions described in Example 2 and the paste product is milled as described in Example 2.

Red brown shades are obtained in viscose which are lighter and less intense than those described in Examples 1 and 2.

*Example 4*

Instead of the 245.7 parts of 3:3'-dichlorobenzidine sulphate and 73.2 parts of o-dianisidine used in Example 2 there are used 61 parts of o-dianisidine and 263.3 parts of 3:3'-dichlorobenzidine sulphate and instead of the 376 parts of 1-p-tolyl-3-methyl-5-pyrazolone there are used 373 parts of 1-phenyl-3-methyl-5-pyrazolone.

The pigment paste so obtained yields pigmented viscose of yellower, brighter and less intense shades than those obtained with the product of Example 2, with the same excellent fastness properties.

*Example 5*

A tetrazonium sulphate solution is prepared from 298.3 parts of 3:3'-dichlorobenzidine sulphate and 263 parts of sulphuric acid in 9000 parts of water. The solution is mixed with the tetrazonium sulphate solution prepared separately from 36.6 parts of o-dianisidine and 61.8 parts of sulphuric acid in 1500 parts of water.

To the mixed solutions at 5° C. there are added 800 parts of sodium acetate crystals. The resulting solution is stirred and there is added a suspension of 16 parts of dispersed carbon black (prepared as described in Example 1) in a solution of 414 parts of 1-p-tolyl-3-methyl-5-pyrazolone and 90 parts caustic soda in 12,000 parts of water. The resulting light brown pigment suspension is stirred for 1 hour to complete the coupling and then heated to 95° C. The suspension is filtered and the resulting paste is washed with cold water and dried at 95° C. and the product is then ground to a fine powder.

The powder may be incorporated into polyvinyl chloride to produce bright strong tan-brown shades which are non-migrating and are fast to processing. The powder may also be readily incorporated into rubber to produce bright strong tan-brown shades fast to migration, to vulcanisation and to light.

If the pigment paste instead of being dried at 95° C. is ball milled with a concentrated aqueous solution of a mixture of 190 parts of disodium dinaphthylmethane-di-β-sulphonate and 30 parts of sodium oleo-p-anisidine-3-sulphonate, there is obtained a stable, highly dispersed paste which may be incorporated into viscose solution before spinning to give bright tan shades of excellent fastness properties.

*Example 6*

A solution is prepared by heating to 95° C., 210.6 parts of 3:3'-dichlorobenzidine sulphate and 84.8 parts of o-tolidine in 4500 parts of water containing 211.7 parts of hydrochloric acid. The solution is cooled to 0° C. an tetrazotised by the rapid addition of an aqueous solution of 145 parts of sodium nitrite. To the filtered solution there are added 40 parts of a concentrated aqueous solution of disodium dinaphthylmethane-di-β-sulphonate, 800 parts of sodium acetate crystals, and a highly dispersed suspension of 200 parts of carbon black prepared as described in Example 1. The suspension is well stirred and a solution of 400 parts of 1-p-tolyl-3-methyl-5-pyrazolone and 87 parts of caustic soda in 10,000 parts of water is gradually added.

The brown pigment suspension so obtained is isolated as a paste and subsequently ball milled as described in Example 2. Alternatively the paste may be mixed with a dispersing agent and heated to 95° C. as described in Example 1. The product obtained is a stable paste showing no separation of the constituent pigments on storage.

The paste may be used for the mass pigmentation of viscose solution prior to spinning when deep brown shades of high tinctorial strength and excellent fastness properties are obtained.

I claim:

1. A process for the manufacture of brown pigments useful for the mass pigmentation of viscose and for coloring rubber and synthetic plastics which comprises coupling one molecular proportion of a tetrazotized amine of the formula

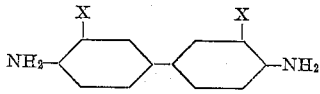

wherein X is selected from the group consisting of hydrogen, halogen, lower alkyl radicals, and lower alkoxy groups with a 1-aryl-3-methyl-5-pyrazolone wherein the aryl radical is selected from the group consisting of phenyl and substituted phenyl radicals in the presence of gas black which is in the form of an aqueous dispersion in one of the solutions employed in said coupling operation and which contains no particles greater than 10 microns in diameter with the bulk of its particles not greater than 6 microns in diameter.

2. A process for the manufacture of brown pigments useful for the mass pigmentation of viscose and for coloring rubber and synthetic plastics which comprises coupling one molecular proportion of a tetrazotized amine which is a mixture of 3:3'-dichlorobenzidine and o-dianisidine with 1-p-tolyl-3-methyl-5-pyrazolone in the presence of gas black which is in the form of an aqueous dispersion in one of the solutions employed in said coupling operation and which contains no particles greater than 10 microns in diameter with the bulk of its particles not greater than 6 microns in diameter.

JOSEPH GLASSMAN.

REFERENCES CITED

The following references are of record in the file of this patent:

UNITED STATES PATENTS

| Number | Name | Date |
|---|---|---|
| 2,118,512 | Hucks | May 24, 1938 |
| 2,410,219 | Langstroth | Oct. 29, 1946 |

OTHER REFERENCES

Jennison: Lake Pigments from Artificial Colors, pages 55 and 56.